C. E. DUNHAM.
SPRING WHEEL.
APPLICATION FILED MAR. 4, 1911.
1,011,171. Patented Dec. 12, 1911.
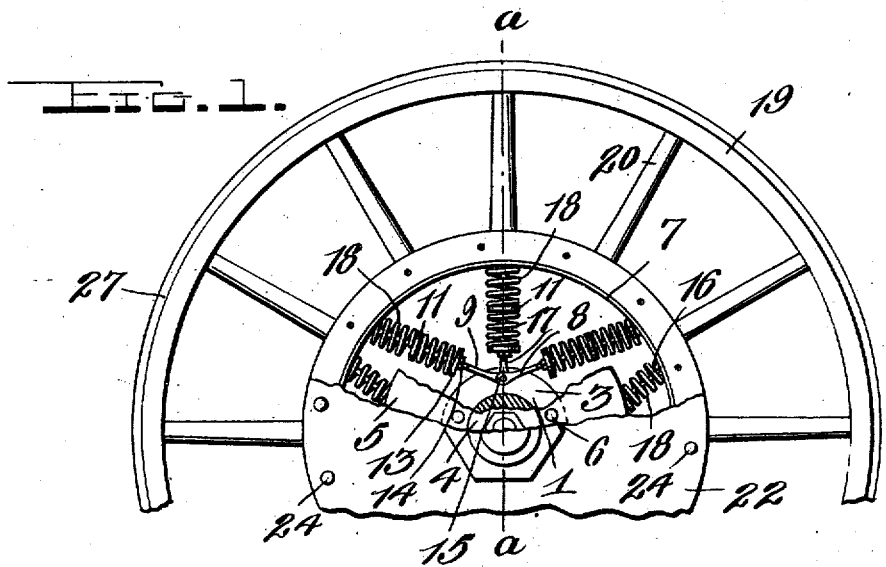
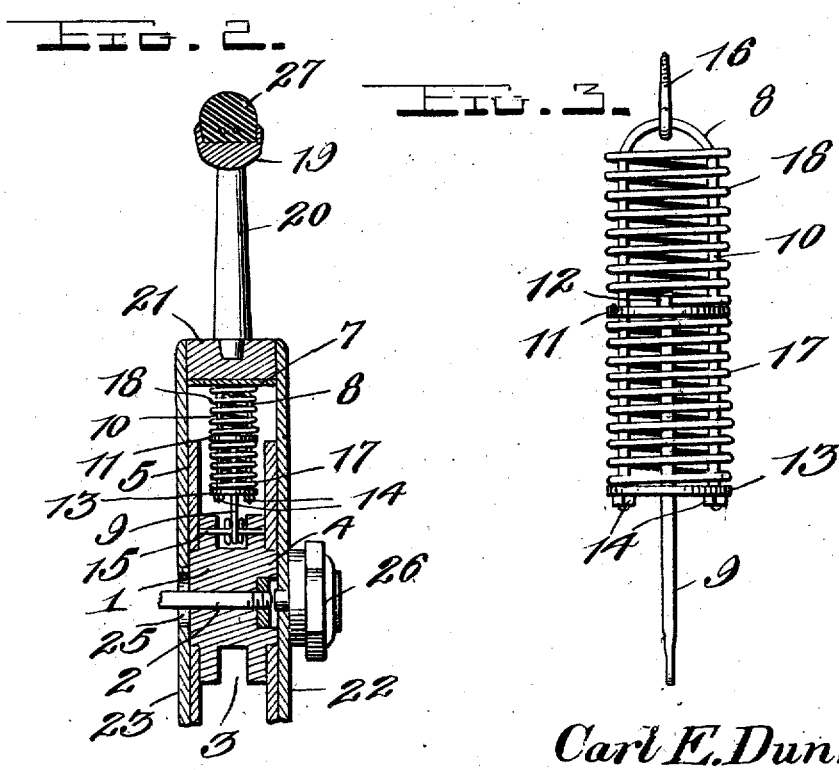
Witnesses
Chas. L. Griestauer.
L. G. Ellis.
Inventor
Carl E. Dunham,
By Watson E. Coleman.
Attorney

UNITED STATES PATENT OFFICE.

CARL E. DUNHAM, OF MADDOCK, NORTH DAKOTA.

SPRING-WHEEL.

1,011,171.	Specification of Letters Patent.	Patented Dec. 12, 1911.

Application filed March 4, 1911. Serial No. 612,264.

*To all whom it may concern:*

Be it known that I, CARL E. DUNHAM, a citizen of the United States, residing at Maddock, in the county of Benson and State of North Dakota, have invented certain new and useful Improvements in Spring-Wheels, of which the following is a specification, reference being had to the accompanying drawings.

This invention is an improved spring wheel for automobiles and other vehicles, and consists in the construction, combination and arrangement of devices, hereinafter described and claimed.

The object of my invention is to provide an improved wheel in which the hub is movable eccentrically and in which the main portion of the wheel is connected to the hub by means of springs which serve to cushion the wheel, normally maintain the wheel concentric with its hub, and yet permit the wheel to yield and rebound when the same encounters inequalities in the road surface, thereby causing the vehicle to ride smoothly and easily without jolts and jars, and also enabling the use of pneumatic tires to be dispensed with.

In the accompanying drawings—Figure 1 is partly an elevation and partly a sectional view of a spring wheel constructed in accordance with my invention. Fig. 2 is a transverse sectional view of the same on the plane indicated by the line *a—a* of Fig. 1. Fig. 3 is a detail elevation of one of the extensible spring cushioned connections between the inner hub element and the outer hub element.

In accordance with my invention, I provide an inner hub member 1, which is here shown as having the usual bore 2, for the reception of an axle spindle. The said hub element is provided wth a peripheral annular groove 3, and is provided at its ends with concentrically disposed cylindrical bosses 4. Disks 5, have central openings through which the bosses extend. The said disks bear against the ends of the hub member 1, and are secured thereto by bolts 6, the heads of which are counter-sunk therein. The outer member 7 of the hub is a band or ring as shown, and this band or ring is normally concentric with the hub member 1, and is connected thereto for eccentric movement by means which I will now describe.

Extensible links 8 comprise each a bar member 9, and a U-shaped member 10. To the outer end of each bar member is secured a guide disk 11, by means of nuts 12, the said bar member extending through a central opening in the disk, and the nuts being on opposite sides of the latter. The arms of the U-shaped member 10, extend through and are guided in openings in the disk 11, and are provided at their ends with a disk 13, the said disk being secured by nuts 14, and having a central opening in which the bar member 9 is free to slide. The inner end of each bar member 9 is disposed in the groove 3, of the hub member 1, and is pivotally mounted on a bolt or pin 15, which extends lengthwise through the said hub member. The outer end of each U-shaped member 10 is connected to the band 7 which forms the outer hub member as by means of a suitable eye bolt 16. On each extensible link is a pair of co-acting springs 17, 18, which are here shown as coil springs, the inner spring 17 bearing between the disks 11, and 13, and and the outer spring 18 bearing between the disk 11 and the outer hub member or ring or band 7, some of the extensible links being disposed radially and others being disposed tangentially in the annular space between the hub members 1 and 7. It will be understood that the coacting springs while enabling the links to lengthen and shorten so as to afford eccentric movements to the outer hub member or ring 7, coact with the links to connect the outer hub member to the inner hub member, and to cushion the same.

The wheel has in addition to the outer rim or felly 19, and the spokes 20, an inner rim 21 in which the ring or band 7 constituting the outer hub element is fitted. A pair of covering disks 22, 23 are secured respectively on the outer and inner sides of the spring hub by means of bolts or other suitable devices 24, which engage the inner rim 21 of the wheel. The inner covering disk 23 has a central opening 25 of suitable size to clear the axle and permit of eccentric movement of the inner hub member with respect to the outer portion of the wheel. The outer covering disk 22 is here shown as provided at its center with an ornament 26 which performs no function. A suitable tire 27 is placed on the wheel rim 19, and in practice may be a solid rubber tire, or any other suitable form of tire may be employed for this purpose within the scope of my invention.

I claim—

In a spring wheel, the combination of an outer member comprising a felly, a tire, an inner rim and spokes, an inner hub member having disks on its ends, covering disks secured to the inner and outer sides of the inner rim and bearing against the ends of the inner hub member and on the outer sides of the first named disks, the said inner hub member being movable eccentrically between said covering disks, and links connecting the inner hub member and the inner rim, each link comprising a pair of slidably related members enabling them to be lengthened and shortened and co-acting springs on the said links, the inner ends of said links being pivotally connected to the inner hub member, the said links being disposed in groups, each group comprising a radial member and a pair of tangentially disposed members on opposite sides of the radial member, the inner ends of the members of each group having a common pivot connecting them to the inner hub member.

In testimony whereof I hereunto affix my signature in the presence of two witnesses.

CARL E. DUNHAM.

Witnesses:
D. G. DUNHAM,
WM. JACOBSON.

Copies of this patent may be obtained for five cents each, by addressing the "Commissioner of Patents, Washington, D. C."